April 22, 1930.   A. F. VICTOR   1,755,280
MINIATURE MOTION PICTURE THEATER
Filed Dec. 15, 1924   3 Sheets-Sheet 1
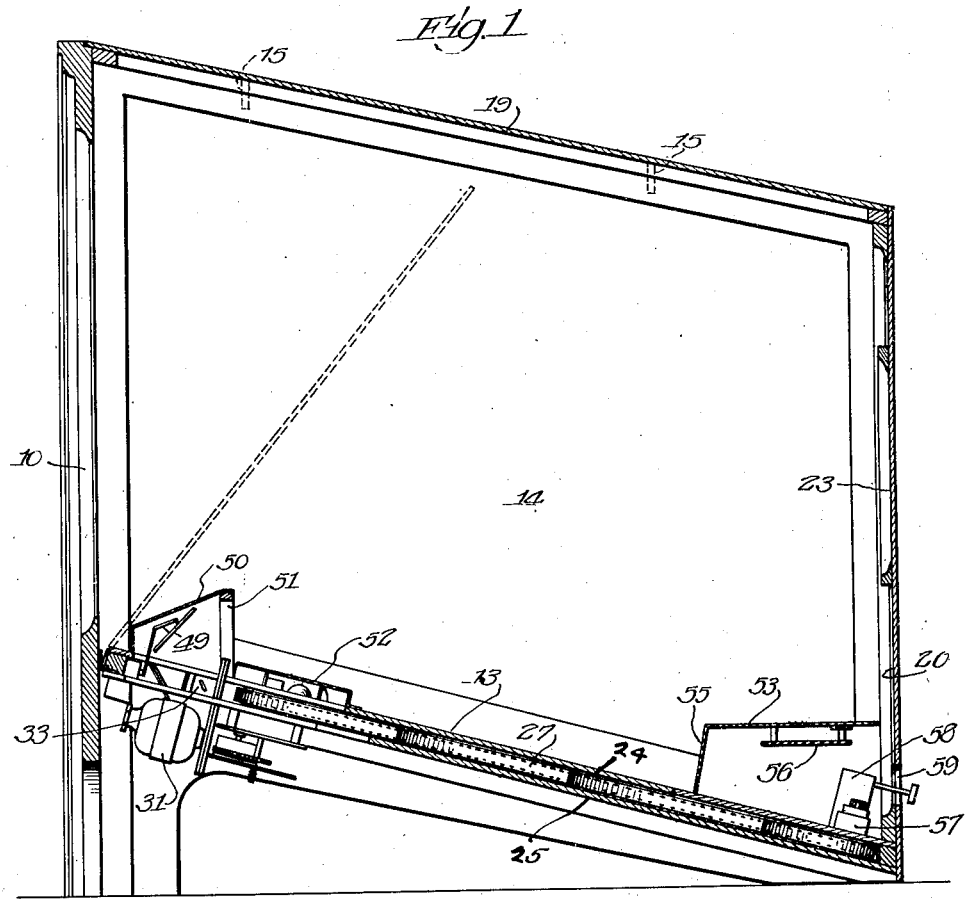
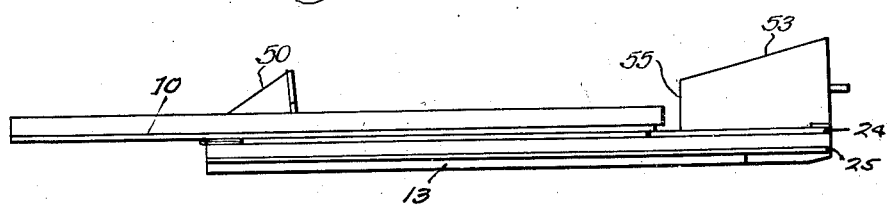

April 22, 1930. A. F. VICTOR 1,755,280
MINIATURE MOTION PICTURE THEATER
Filed Dec. 15, 1924    3 Sheets-Sheet 2
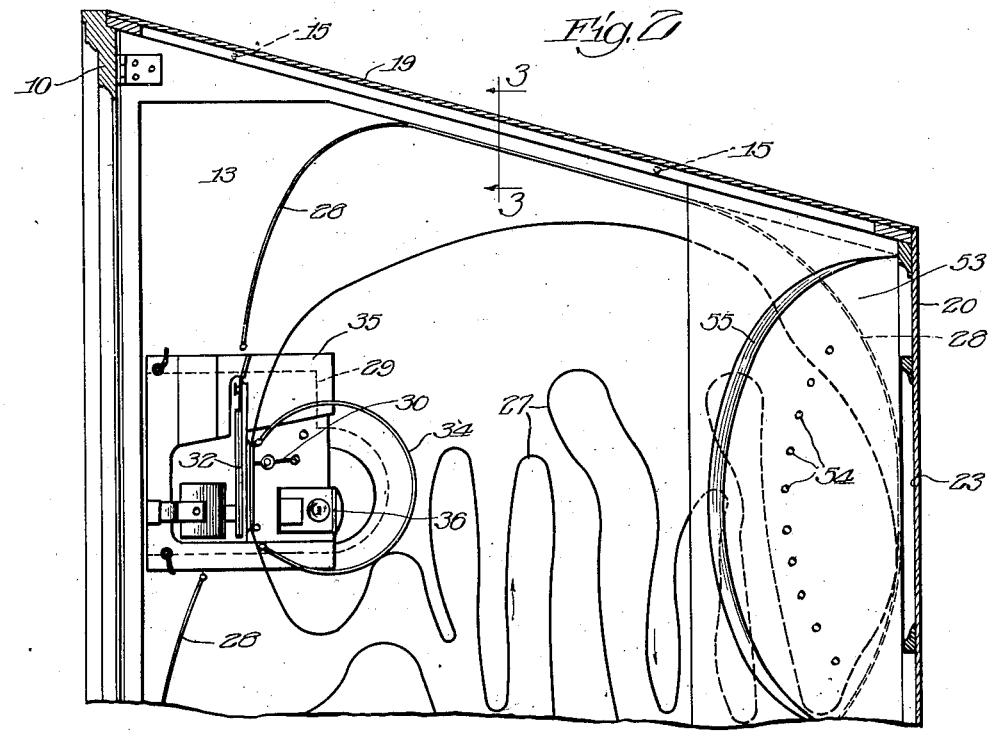
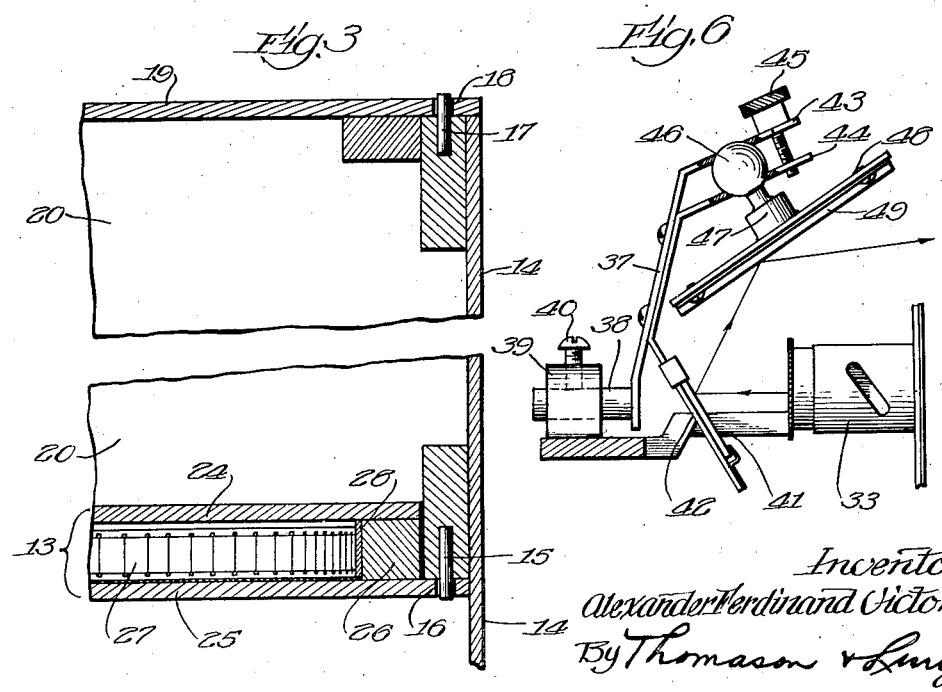
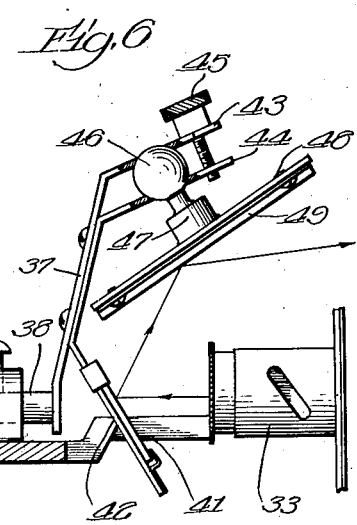

April 22, 1930.  A. F. VICTOR  1,755,280
MINIATURE MOTION PICTURE THEATER
Filed Dec. 15, 1924   3 Sheets-Sheet 3
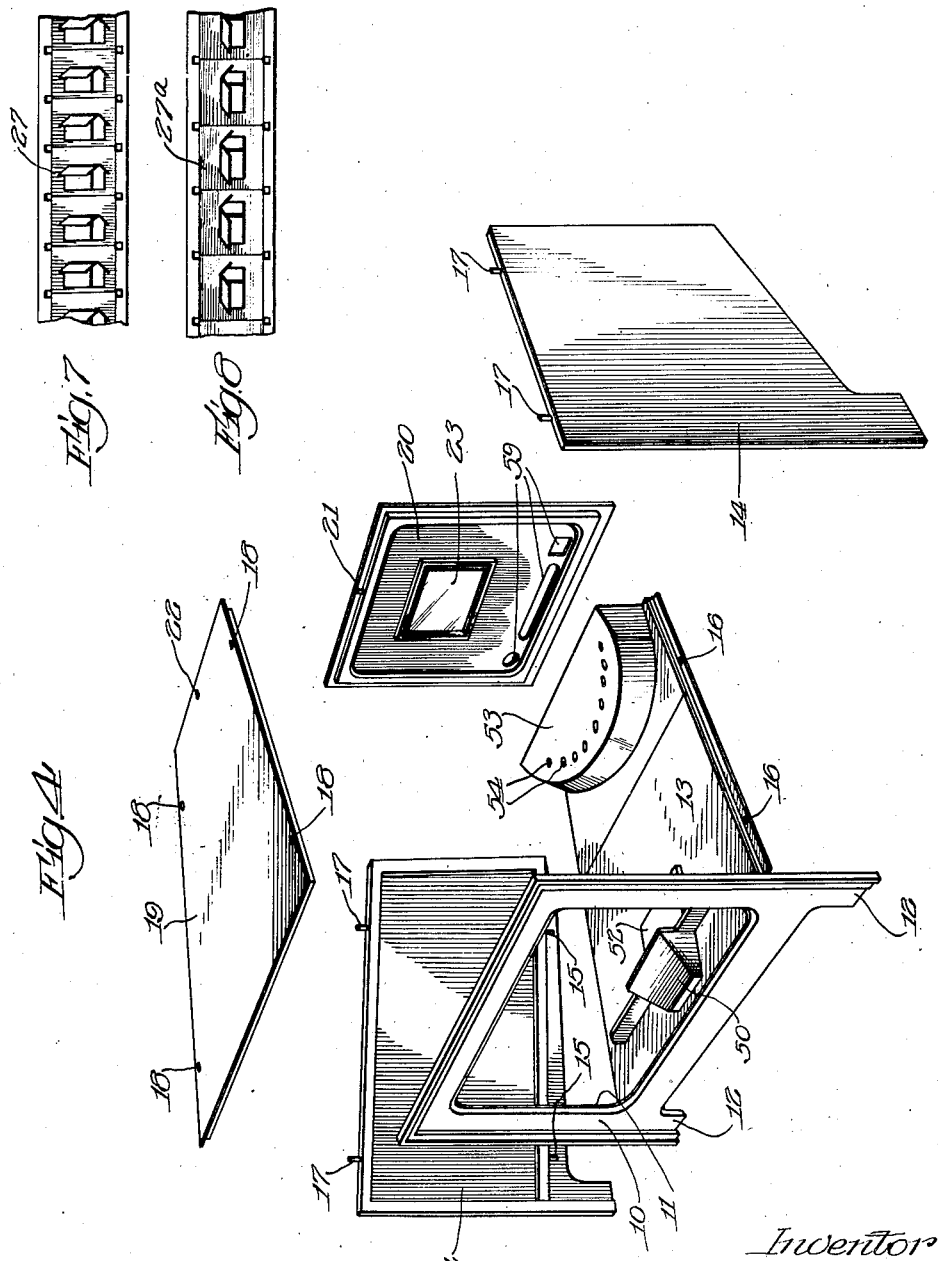

Patented Apr. 22, 1930

1,755,280

UNITED STATES PATENT OFFICE

ALEXANDER FERDINAND VICTOR, OF DAVENPORT, IOWA

MINIATURE MOTION-PICTURE THEATER

Application filed December 15, 1924. Serial No. 756,047.

My present invention relates to the projection of cinematographic pictures, and has more particular reference to the construction, arrangement and mechanical features of a motion picture theater of miniature proportions that may be readily employed in connection with a show-window advertising display, or may be utilized as a toy for children.

One of the primary objects of my invention is to so construct and arrange the parts of the device that they may be readily knocked down and packed in a small space for storage or shipment. Another of the principal objects of my invention resides in providing, by simple means, an arrangement whereby the use of a film-spool or reel may be dispensed with and the film maintained in the desired relation to the feeding devices of a projecting mechanism without liability of entangling or piling up the film as is so frequently the case when cinematographic film is loosely disposed in a box, or other container. I do this in a simple manner, by placing the film upon an inclined support with the feed mechanism at a high portion in order that the bulk of the film will be kept at the lower portion of the support by gravitation. By this arrangement, and with the use of a half-size standard film, I am able to employ a strip several hundred feet in length, and, by securing the ends of the film together, the strip may be operated continuously for several hours and the picture or other matter upon the film will thereby be repeated as many times as desired. When such an arrangement is used in a show window display or advertising scheme the apparatus may be started and thereafter run for several hours.

In a standard film the images thereon are arranged in successive order one below the other, the lower edge of one view being adjacent the upper edge of the next view while the strip is being fed in a vertical plane. With my present structure the projector is placed upon its side so that the film is fed in a horizontal plane, and it therefore becomes necessary to divert or twist the light rays so that the images will be seen in an upright or erect position upon the screen. In this connection it is also an object of my invention to provide a simple and dependable structure of novel arrangement that is capable of unlimited adjustment whereby the images leaving the projector will be turned to an upright position prior to reaching the screen and which may also be adjusted to center the picture upon the screen.

Further objects of my invention reside in providing a structure having the foregoing characteristics that is sturdy in construction, efficient and dependable in operation, novel in the arrangement and disposition of its parts, and economical to manufacture so that it may be sold for a moderate price.

I prefer to carry out my invention and accomplish the foregoing objects in substantially the manner hereinafter fully described and as more particularly pointed out in the appended claims. Reference will now be made to the accompanying drawings that form a part of this specification, in which;

Figure 1 is a vertical longitudinal section of the structure, the view being taken on line 1—1 of Figure 2.

Figure 2 is a substantially horizontal section of the double bottom or floor with a portion of the upper element thereof removed for clearness.

Figure 3 is an enlarged detail section on line 3—3 of Figure 2, illustrating the manner of assembling the wall sections of the structure.

Figure 4 is a perspective of the structure showing the sections or parts disassembled and about to be set up.

Figure 5 is a side edge view of the front wall and the floor or bottom member folded together for storage.

Figure 6 is a detail, in side elevation and enlarged, of the device for righting or erecting the images upon the screen.

Figures 7 and 8 are schematic views of film such as may be employed in the device.

In the drawings I have illustrated a typical or preferred embodiment of my invention which consists of a box-like structure the wall-sections of which are co-ordinated with each other so that they may be readily knocked down for convenient storage or shipment, and when these sections are in assembled form they present to the observer the appearance of a motion-picture theater in miniature with a picture on display therein upon a screen. The structure comprises a vertical front wall member 10 having a fenestra 11, through which the inside of the box may be viewed from the exterior, and at the end of its lower edge it is provided with extensions 12 that elevate the member a slight distance above the floor, table, or other structure upon which the box rests. Hingedly connected at its forward edge to the lower portion of front member 10 is a bottom or floor member 13, the detail of which will be later described, and which has its side edge converged towards the rear of the box. As will be seen in Figs. 1 and 4 this bottom or floor member slopes or inclines downwardly from a plane below the sill of the fenestra 11, in the front wall member while its rear edge rests upon the floor, table or other support for the structure. Side walls 14 engage at their forward vertical edge with the ends of the front member 10 and their lower portions are provided with dowel pins 15 that enter holes 16 made in corresponding or registering portions of the floor member of the box to prevent lateral movement when assembled. In order to create the impression of a decided convergence of the interior the upper and lower edges of the side walls 14 are made to slope downwardly from the front towards the rear of the box at approximately the same angle as the slope of the floor member, and their upper edges are provided with dowel pins 17 that enter holes 18 in the top member or ceiling 19 of the box, which latter is of keystone shape with rearwardly converging longitudinal side edges. The back or rear wall 20 of the box is substantially rectangular in shape and has a dowel pin 21 projecting from its upper edge to enter a hole 22 in the adjacent rear edge of the ceiling member 19 when the latter is placed in the desired position upon the upper edges of the vertical walls. A white or silvered screen 23 is marked off in the inner surface of the rear wall and may or may not be enclosed in a framing as shown. As will be seen in the drawings the edges of the vertical walls, as well as the floor and ceiling members, are provided with longitudinally extending shoulders to permit the interfitting of the sections in assembled form.

The floor member 13 is formed with two flat pieces of material 24 and 25 that are spaced a slight distance apart by means of marginal strips 26, the space between the pieces 24 and 25 being slightly greater than the width of the ribbon or film 27 that is placed therebetween and disposed upon its longitudinal edge. The film however is not wound upon a spool or reel as is usually the case, but lies in loose folds upon the lower piece 25 of the double floor of the miniature theater, which provides a film compartment as will be seen by reference to the detail in the lower portion of Fig. 3 of the drawings, and for the purpose of providing an effective guide and also to prevent the piling up of the folds of the film ribbon and forcing the film into the corners of this double floor I have provided a retainer or guide in the form of a curved strip of metal 28 set upon its edge and resting on the lower floor piece 25. In the lower member 25 of the double floor I form an irregular shaped opening 29, shown in dotted lines in Fig. 2, adjacent the edge nearest the front wall of the structure and in this opening is mounted the film feed and projecting apparatus which may be of any desired type that will be found convenient to install therein. The structure which is schematically illustrated herein is similar to that disclosed in United States Letters Patent No. 1,625,065 granted to me April 19, 1927, for an "intermittent film feed". As schematically shown in the drawings herein the oscillatory film feeding arm 30 is actuated through operable connection with a small electric motor 31, which latter is suitably secured to the projector unit and is disposed below the plane of the double bottom or floor 13 (Fig. 1). In the structure disclosed in my above-mentioned application the film ribbon is fed vertically through a vertically disposed film-path or channel 32 in the apparatus, but in order to accommodate this projector unit to the present device the same is placed upon one side which disposes the film-path or channel 32 in a horizontal plane or at a right angle to the usual plane of feed, and it will be understood that this film-path or channel therefore lies parallel with the pieces forming the double bottom or floor 13 so that the film is received from one side and, after passing the lens tube 33 of the projector, it will be discharged from the other end of the film-path or channel so that it will gravitate from the opposite side of the apparatus as will be seen in Fig. 2. I prefer to mount a guard 34, consisting of a strip of metal bent in a curve, upon the carrier plate 35 of the projector structure, which guard forms a loop around the illuminating element 36 and protects the film against contact with the latter.

The means that I prefer to employ for "erecting" the images or turning them from horizontal to vertical is illustrated in detail in Fig. 6, and consists of an irregular shaped bracket 37 having a trunnion or pivotal stub 38 that is rotatably adjustable in a boss 39 in front of the lens tube 33 of the projector and which may be maintained in its divers positions by a set screw 40. Preferably, the trunnion 38 has its axis alined with the axis of the lens 33 so that a reflector 41 mounted upon an oblique arm 42 projecting from the bracket 37 is constantly in front of the lens-tube and across the axis of projection so that it receives the light rays therefrom. At its outer portion the bracket 37 is bifurcated to provide two substantially parallel yielding members or extensions 43 and 44 that may be drawn towards each other or separated whenever desired through the action of the thumb screw 45. A ball 46 is interposed between the extensions 43 and 44 and is seated in apertures or depressions formed in the facing portions of these extensions, the same being frictionally maintained by the clamping action of the thumb screw, and extending radially from this ball is the shank 47 of a holder 48 that carries a reflector 49. Thus it will be seen that the reflector 49 will have a universal adjustment due to its ball and socket connection with the supporting bracket and may be so positioned that the light rays and images from the reflector 41 will be directed to the screen, and by making the proper adjustment of the respective reflectors the images that are received from the lens tube by the reflector 41 and are horizontally disposed will be thrown back over the projector to the screen by the reflectors 41 and 49 in an upright or erect position. Also by making the desired adjustment of these reflectors the pictures etc. will be properly centered upon the screen.

As will be seen in the drawings the reflector 49 and portions of the projector apparatus extend through opening 29 and above the plane of the upper surface of the double floor section 13, so that, in order to obscure these parts from the observers or spectators who are looking through the fenestra 11, I have covered the same with a hood 50 that has an opening 51 in its wall that is towards the screen, through which opening the light rays from the reflector 49 may pass in unobstructed range to the screen. A shield 52 of rectangular shape is placed over the lamp or light unit to prevent discharge of the direct light rays from the latter into the interior of the theater.

I have found it is sometimes desirable to provide suitable resistance and control devices and these I have enclosed within a housing at the rear of the theater and below the screen. This consists of a metal plate 53 having a segmental shaped edge extending forwardly from the lower portion of the rear wall 21 below the lower edge of the screen, which plate is provided with ventilating perforations 54 and has a substantially vertical disposed wall plate 55 depending from its outer edge and resting upon the floor of the theater. The forgoing structure provides a miniature stage below the screen and also affords a fireproof housing or enclosure for a resistance unit 56 through which the current from the usual service conductors may be passed prior to being led to the projecting apparatus for turning on and off the current. A snap-switch 57 is installed below the stage above described and for the purpose of regulating the speed of the motor or the volume of light desired I may also install a suitable controller 58 adjacent said snap-switch. In the lower portion of the rear wall 20 I make a plurality of openings 59 which are so located below the plane of the stage floor that they afford additional ventilation for the resistance unit as well as accessibility to the elements housed within the stage.

From the foregoing it will be seen that I have provided a motion-picture display structure having the interior appearance of a theater and upon the screen may be displayed pictures and advertising matter projected thereon from an obscured source. The parts are all dependably housed and the wall sections of the theater may be readily knocked-down, for storage or shipment. By inclining the floor member away from the projector and providing a false-bottom I have made provision for the storage of a considerable quantity of film which, by joining the ends together, may be made to run continuously for a period of several hours during which the exhibition is repeated a number of times. The inclination of the floor section (which is the film container) serves to move the film away from the projector by gravitation towards the lowest portion of the container, and by placing the film upon edge within this container the film is prevented from piling up due to the fact that the two members of the double floor are spaced apart a distance only slightly greater than the width of the film. By the use of the reflectors and the facing of the projector to throw its images away from the screen I am enabled to place the images erect upon the screen, and thereby obviate the necessity of using a special film $27^a$ in which the pictures are taken in a horizontal plane. In the present structure while I may employ the regulation or standard film I prefer to utilize the toy size film 27 (Fig. 7) as there is a greater number of pictures upon a given length of this film as compared with said standard film and therefore a longer display may be had. It will be understood however that film may be used in which the pictures will stand vertically when the film is moved in a horizontal direction, such a film being schematically shown in Fig. 8 of the drawings. With such a film $27^a$ it is unnecessary to "erect" the images as heretofore described and consequently only one mirror will be required to reflect the light rays to the screen.

While I have herein illustrated and described certain instrumentalities for carrying out my invention, it will be obvious to others skilled in the art that divers modifications, refinements, or changes may be made in the construction and arrangement of the parts without departing from the principles I have disclosed. It will also be understood that while the structure herein described is disclosed in connection with the projection of the motion pictures it is well adapted for use in connection with a camera for the taking of motion pictures and I do not disclaim such use. I therefore desire it understood that all such altered structures are fully contemplated within the scope of my invention as expressed in the appended claims.

What I claim as new is:

1. A motion picture display device comprising a housing the front wall of which is provided with an opening and the walls extending therefrom converging towards the rear, mechanism for moving films in a horizontal plane and mounted adjacent the front wall of said housing, a screen positioned to receive the images from the film, a flat substantially horizontal floor inclined downwardly from the front wall towards said screen, and a film container underneath said floor the film supporting surface of which is flat and inclined parallel with the floor, whereby the film placed loosely within said container is maintained upon its longitudinal edge and by gravity at the lower portion of said container.

2. A motion picture display device comprising a housing having a bottom inclined downwardly towards its rear, a film container underneath said bottom, the film supporting surface of which is flat and inclined parallel with the bottom of the housing, whereby the film placed loosely within said container is maintained upon its longitudinal edge and by gravity at the lower portion of said container, mechanism for moving film in a horizontal plane at the front of said housing and positioned to receive the film from said container, and a screen at the opposite end of said housing upon which the images on the film are received.

3. In a motion picture device means for moving film horizontally and a film container adjacent thereto, the film supporting surface of which is flat and substantially horizontal and inclines away from said means whereby the bulk of the film is maintained upon its longitudinal edge away from the means by gravity.

4. In a motion picture device means for moving film horizontally, and a film container adjacent thereto consisting of a walled structure having a flat substantially horizontal bottom that is inclined downwardly away from said means whereby the bulk of the film is maintained upon its longitudinal edge away from said means by gravity.

5. In motion picture apparatus means for moving film horizontally, and a film container adjacent thereto consisting of a narrow flattened substantially horizontally disposed container within which the film is supported upon its longitudinal edge in loose folds, the top and bottom walls of said container being spaced a distance slightly greater than the width of the film and the film supporting surface of said container being inclined away from said means whereby the bulk of the film is maintained by gravity in the portion of the container farthest from said means.

6. In a motion picture apparatus means for moving film horizontally, and a film container adjacent thereto consisting of a walled structure of relatively narrow vertical proportions and inclined downwardly from said means, the vertically spaced walls of said container being flat throughout and the film therein being disposed upon its longitudinal edge in loose folds, whereby the bulk of the film is maintained in the portion of the container farthest from said means.

7. In a motion picture apparatus means for moving film horizontally, and a film container adjacent thereto consisting of edge walls, and flat substantially horizontally disposed top and bottom parallel walls inclined downwardly from said means and spaced apart vertically a distance slightly greater than the width of the film, whereby the film is disposed upon its longitudinal edge upon the bottom wall and is maintained in the lower portion of the container by gravity.

8. A miniature motion picture theater comprising a plurality of vertical walls, an image receiving screen upon one of said walls and the wall opposite thereto provided with an opening through which the interior including said screen is visible, film feeding means mounted within the confines of said vertical walls and opposite said screen for moving the film in a horizontal plane, and a floor engaged with the lower portions of said vertical walls, the film being supported upon its longitudinal edge upon said floor and disposed in loose loops.

9. A miniature motion picture theater comprising a plurality of vertical walls, an image receiving screen upon one of said walls and the wall opposite thereto provided with an opening through which the interior including said screen is visible, a film feeding and projecting apparatus mounted within the confines of said vertical walls and opposite said screen, a floor engaged with the lower portions of said vertical walls, the film being supported upon its longitudinal edge upon said floor and disposed in loose loops, and guards upon opposite sides of said feeding and projecting apparatus and converging towards the same whereby the film is guided to and discharged from said apparatus clear of the same.

10. A miniature motion picture theater comprising a plurality of interfitting knockdown vertical walls, an image receiving screen upon one of said walls and the wall opposite thereto provided with an opening through which the interior including said screen is visible, the film feeding and projecting apparatus mounted within the confines of said vertical walls and opposite said screen, and an inclined floor engaged with the lower portions of said vertical walls and hinged to one of the same so as to be folded flat against said wall, the film being supported upon its longitudinal edge on said floor and disposed in loose loops whereby the bulk of said film is maintained at the lower portion of said floor by gravity.

11. A miniature motion picture theater comprising a plurality of interfitting knockdown vertical walls, an image receiving screen upon one of said walls and the wall opposite thereto provided with an opening through which the interior including said screen is visible, a film and projecting apparatus mounted within the confines of said vertical walls and opposite said screen, an inclined floor engaged with the lower portions of said vertical walls and hinged to one of the same so as to be folded flat against said wall, the film being supported upon its longitudinal edge on said floor and disposed in loose loops whereby the bulk of said film is maintained at the lower portion of said floor by gravity, and guards upon opposite sides of said feeding and projecting apparatus and converging towards the same to guide the film to and discharge it from said apparatus clear of the same.

12. In motion picture apparatus, a film strip on which the images are arranged with their bases transverse to the longitudinal edge of the film, a projecting device, means for feeding the film strip horizontally through said device, an inclined reflector interposed in the line of projection of said device, and a second reflector bodily movable around the line of projection of said device and interposed in the line of reflection of said reflector whereby the images projected by said device are directed in erect positions upon a screen out of the line of projection of said device.

13. In a motion picture apparatus, a film strip on which the images are arranged with their bases transverse to the longitudinal edge of the film, a projector through which the strip of film is fed in a horizontal direction, an inclined reflector interposed in the axis of projection therefrom, and a second reflector bodily movable around the axis of projection and having universal adjustability independent of its bodily movement whereby to erect the images upon the screen.

14. In a motion picture apparatus, a film strip on which the images are arranged with their bases transverse to the longitudinal edge of the film, a projector device through which the strip of film is fed in a horizontal direction, an inclined reflector interposed in the axis of projection therefrom and having rotative adjustability on a fixed axis, and a second reflector bodily movable with said first reflector and around the axis of projection, said second reflector having universal adjustability independent of its before mentioned movement whereby to erect the images upon the screen.

15. In a motion picture apparatus, a film strip on which the images are arranged with their bases transverse to the longitudinal edge of the film, a projector device through which the strip of film is fed in a horizontal direction, a movable bracket mounted upon a pivot the axis of which is parallel with the axis of projection from said device, a reflector supported by said bracket and disposed at a fixed angle in the axis of projection, and a reflector movably mounted upon said bracket whereby the same may be adjusted to divers planes in the axis of reflection from the first reflector to direct the images from said projector to a screen at the rear of the latter in erect positions.

16. In a motion picture apparatus, a film strip on which the images are arranged with their bases transverse to the longitudinal edge of the film, a projector device through which the strip of film is fed in a horizontal direction, an inclined reflector interposed in the axis of projection of said device and mounted to rotate on said axis, and a second reflector spaced from the first reflector and movable coincident therewith, said second reflector having also universal adjustability independent of its before mentioned movement, whereby said second reflector receives the images from the first reflector and said images are displayed in upright vertical position upon a screen back of the projector.

Signed at Davenport, county of Scott and State of Iowa, this 28th day of Oct., 1924.

ALEXANDER FERDINAND VICTOR.